US012636935B2

(12) United States Patent
Mancini

(10) Patent No.: US 12,636,935 B2
(45) Date of Patent: May 26, 2026

(54) FUNCTIONAL BLOCK FOR DISTRIBUTING A HEATING LOAD OR A COOLING LOAD VIA COOLANT IN A VEHICLE

(71) Applicant: Ford Global Technologies, LLC, Dearborn, MI (US)

(72) Inventor: Nicholas D. Mancini, Los Gatos, CA (US)

(73) Assignee: Ford Global Technologies, LLP, Dearborn, MI (US)

( * ) Notice: Subject to any disclaimer, the term of this patent is extended or adjusted under 35 U.S.C. 154(b) by 113 days.

(21) Appl. No.: 18/650,885

(22) Filed: Apr. 30, 2024

(65) Prior Publication Data

US 2025/0332883 A1 Oct. 30, 2025

(51) Int. Cl.
*B60H 1/32* (2006.01)
*B60H 1/00* (2006.01)

(52) U.S. Cl.
CPC ..... *B60H 1/00885* (2013.01); *B60H 1/32281* (2019.05); *B60H 2001/00307* (2013.01); *B60H 2001/00928* (2013.01)

(58) Field of Classification Search
CPC ...... B60H 2001/00307; B60H 1/00278; B60H 1/00885; B60L 58/26
See application file for complete search history.

(56) References Cited

U.S. PATENT DOCUMENTS

| | | | | |
|---|---|---|---|---|
| 8,448,460 B2 * | 5/2013 | Dogariu | ............. | H01M 10/635 |
| | | | | 62/185 |
| 9,517,677 B2 * | 12/2016 | Tokuda | ............. | B60H 1/00007 |
| 10,967,702 B2 | 4/2021 | Mancini et al. | | |
| 11,673,448 B2 | 6/2023 | Cohan et al. | | |
| 12,351,001 B2 * | 7/2025 | Höfler | ................ | B60H 1/32281 |
| 2022/0402332 A1 * | 12/2022 | Chen | ....................... | B60L 58/26 |
| 2023/0142706 A1 | 5/2023 | Vaddiraju et al. | | |
| 2023/0318088 A1 * | 10/2023 | Ogihara | ............. | H01M 10/615 |
| | | | | 429/62 |
| 2024/0067047 A1 * | 2/2024 | Zeyher | ............... | B60H 1/00271 |
| 2024/0123869 A1 * | 4/2024 | Giunta | ................... | B60L 1/003 |
| 2024/0162530 A1 * | 5/2024 | Lee | ....................... | B60H 1/143 |

(Continued)

FOREIGN PATENT DOCUMENTS

| | | |
|---|---|---|
| KR | 102294620 B1 | 8/2021 |
| WO | 2022062445 A1 | 3/2022 |
| WO | 2022131660 A1 | 6/2022 |

*Primary Examiner* — Nelson J Nieves
(74) *Attorney, Agent, or Firm* — Vichit Chea; Price Heneveld LLP

(57) ABSTRACT

A thermal functional block for a vehicle, includes a functional block inlet, a three-way valve including a valve inlet, a first valve outlet and a second valve outlet, a first coupling point positioned downstream of the first valve outlet, a first heat exchanger positioned downstream of the first coupling point, a splitter having a splitter inlet, a first splitter outlet, and a second splitter outlet, a pump coupled to and downstream of the first splitter outlet, a first check valve positioned downstream of the pump, a second heat exchanger positioned downstream of the first check valve, a second check valve positioned downstream of the second outlet of the splitter, a second coupling point positioned downstream of the second check valve, a functional block outlet, and a bypass coupled to the second outlet of the three-way valve and to the second coupling point.

20 Claims, 11 Drawing Sheets

(56)                    References Cited

U.S. PATENT DOCUMENTS

| 2024/0262157 A1* | 8/2024 | Shrivastava ....... B60H 1/00278 |
| 2024/0383314 A1* | 11/2024 | Allgaeuer .......... B60H 1/00885 |
| 2025/0042218 A1* | 2/2025 | Guo ................... B60H 1/00885 |
| 2025/0229605 A1* | 7/2025 | Hu ..................... B60H 1/00485 |
| 2025/0296405 A1* | 9/2025 | Lindquist ............ B60H 1/3205 |
| 2025/0319737 A1* | 10/2025 | Cha ................... B60H 1/00278 |

* cited by examiner

FUNCTIONAL BLOCK FOR DISTRIBUTING A HEATING LOAD OR A COOLING LOAD VIA COOLANT IN A VEHICLE

FIELD OF THE DISCLOSURE

The present disclosure generally relates to a functional block for distributing a heating load or a cooling load, and more specifically a functional block for distributing a heating or a cooling load via coolant in a vehicle.

BACKGROUND OF THE DISCLOSURE

Vehicles generally require varied heating or cooling loads for various vehicle systems and/or for a Heating, Ventilation, and Air Conditioning system of the vehicle. To meet the varied heating or cooling loads of the vehicle, a coolant may flow through a cooling source and/or a heating source and be distributed to meet the cooling or heating loads of the various vehicle systems.

SUMMARY OF THE DISCLOSURE

According to a first aspect of the present disclosure, a thermal functional block for a vehicle, includes a functional block inlet coupled to a vehicle system, a three-way valve including a valve inlet, a first valve outlet and a second valve outlet, where the valve inlet is coupled to and positioned downstream of the functional block inlet, a first coupling point positioned downstream of the first valve outlet, a first heat exchanger positioned downstream of the first coupling point, a splitter having a splitter inlet, a first splitter outlet, and a second splitter outlet, where the splitter inlet is coupled to and positioned downstream of the first heat exchanger, a pump coupled to and downstream of the first splitter outlet, a first check valve positioned downstream of the pump, a second heat exchanger positioned downstream of the first check valve, wherein the first coupling point is downstream of the second heat exchanger, a second check valve positioned downstream of the second outlet of the splitter, a second coupling point positioned downstream of the second check valve, a functional block outlet coupled to the vehicle system and downstream of the second coupling point, and a bypass coupled to the second outlet of the three-way valve and to the second coupling point, where a coolant flows from the vehicle system, through the thermal functional block, and to the vehicle system.

Embodiments of the first aspect of the present disclosure can include any one or a combination of the following features:

the thermal functional block includes a bypass operating mode, and where when the thermal functional block is in the bypass operation mode the three-way valve is in a bypass position allowing for flow of the coolant from the functional block inlet to flow through the valve inlet to the second valve outlet, and from the second valve outlet flows through the bypass to the functional block outlet;

the thermal functional block includes a first operation mode, and where when the thermal functional block is in the first operation mode the three-way valve is in a bypass position allowing for flow of the coolant from the functional block inlet to flow through the valve inlet to the second valve outlet, the flow of the coolant from the second valve flows through the bypass to the functional block outlet, and further where when the thermal functional block is in the first operation mode the pump is active to circulate the coolant from the pump, to the second heat exchanger, to the first heat exchanger, and returned to the pump;

the thermal functional block includes a second operation mode, and where when the thermal function block is in the second operation mode the three-way valve is in an open position allowing for flow of the coolant from the functional block inlet to flow through the valve inlet to the first valve outlet, the flow of the coolant from the first valve outlet flows through the first heat exchanger and to the thermal functional block outlet, and further where the pump is inactive and prevents flow of the coolant through the second heat exchanger when the thermal function block is in the second operation mode;

the thermal functional block includes a third operation mode, and where when the thermal function block is in the third operation mode the three-way valve is in an open position allowing for flow of the coolant from the functional block inlet to flow through the valve inlet to the first valve outlet, the flow of the coolant from the first valve outlet flows through the first heat exchanger and to the thermal functional block outlet, and further where when the thermal functional block is in the third operation mode the pump is active to circulate the coolant from the pump, to the second heat exchanger, to the first heat exchanger, and returned to the pump;

the thermal functional block includes a fourth operation mode, and where when the thermal function block is in the fourth operation mode the three-way valve is in an open-bypass position allowing for flow of the coolant from the functional block inlet to flow through the valve inlet to the first valve outlet and the second valve outlet, the flow of the coolant from the first valve outlet flows through the first heat exchanger and to the thermal functional block outlet, and the flow of the coolant from the second valve outlet flows through the bypass to the functional block outlet, and further where the pump is inactive and prevents flow of the coolant through the second heat exchanger when the thermal function block is in the fourth operation mode;

the thermal functional block includes a fifth operation mode, and where when the thermal function block is in the fifth operation mode the three-way valve is in an open-bypass position allowing for flow of the coolant from the functional block inlet to flow through the valve inlet to the first valve outlet and the second valve outlet, the flow of the coolant from the first valve outlet flows through the first heat exchanger and to the thermal functional block outlet, and the flow of the coolant from the second valve outlet flows through the bypass to the functional block outlet, and further where when the thermal functional block is in the fifth operation mode the pump is active to circulate the coolant from the pump, to the second heat exchanger, to the first heat exchanger, and returned to the pump;

the second heat exchanger is disposed within ductwork of a heating, ventilation, and air conditioning of said vehicle;

the second heat exchanger is configured as a heater core for the heating, ventilation, and air conditioning system;

the second heat exchanger is configured as a cooler core for the heating, ventilation, and air conditioning system;

the first heat exchanger is a condenser of a refrigeration system; and the first heat exchanger is an evaporator of a refrigeration system.

According to a second aspect of the present disclosure, a thermal functional block for a vehicle, including: a functional block inlet configured to be coupled to a vehicle system, a three-way valve including a valve inlet, a first valve outlet and a second valve outlet, where the valve inlet is coupled to and positioned downstream of the functional block inlet, a first coupling point positioned downstream of the first valve outlet, a first heat exchanger positioned downstream of the first coupling point, a splitter having a splitter inlet, a first splitter outlet, and a second splitter outlet, where the splitter inlet is coupled to and positioned downstream of the first heat exchanger, a pump coupled to and downstream of the first splitter outlet, a first check valve positioned downstream of the pump, a second heat exchanger positioned downstream of the first check valve, wherein the first coupling point is downstream of the second heat exchanger, a second coupling point positioned downstream of the second splitter outlet, a functional block outlet coupled to the vehicle system and downstream of the second coupling point, and a bypass coupled to the second outlet of the three-way valve and to the second coupling point.

Embodiments of the second aspect of the present disclosure can include any one or a combination of the following features:

a second check valve positioned downstream of the second outlet of the splitter and upstream of the second coupling point;

the three-way valve has a first open position configured such that a coolant to flow from the valve inlet to the first valve outlet, a second open position configured such that the coolant to flow from the valve inlet to the second valve outlet, and an open-bypass position configured such that coolant flows from the valve inlet to the first valve outlet and to the second valve outlet;

the pump is a variable speed pump configured to pump varied flows of a coolant; and the second heat exchanger is disposed in ductwork of a heating, ventilation, and air conditioning system of the vehicle.

According to a third aspect of the present disclosure, a thermal functional block for a vehicle, includes a functional block inlet configured to be coupled to a vehicle system, a three-way valve including a valve inlet, a first valve outlet, and a second valve outlet, where the valve inlet is coupled to the functional block inlet, a first coupling point coupled to the first outlet of the three-way valve, a first heat exchanger positioned downstream of the first coupling point, a splitter having a splitter inlet, a first splitter outlet, and a second splitter outlet, where the splitter inlet is coupled to the first heat exchanger, a pump coupled to the first outlet of the splitter, a first check valve position downstream of the pump, a second heat exchanger positioned downstream of the first check valve, where the first coupling point is downstream of the second heat exchanger a second coupling point positioned downstream of the second outlet of the splitter, a functional block outlet coupled to said vehicle system and downstream of the second coupling point, and a bypass coupled to the second outlet of the three-way valve and to the second coupling point.

Embodiments of the third aspect of the present disclosure can include any one or a combination of the following features:

a second check valve positioned downstream of the second splitter outlet and upstream of the second coupling point; and the second heat exchanger is disposed in ductwork of a heating, ventilation, and air conditioning system of the vehicle.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
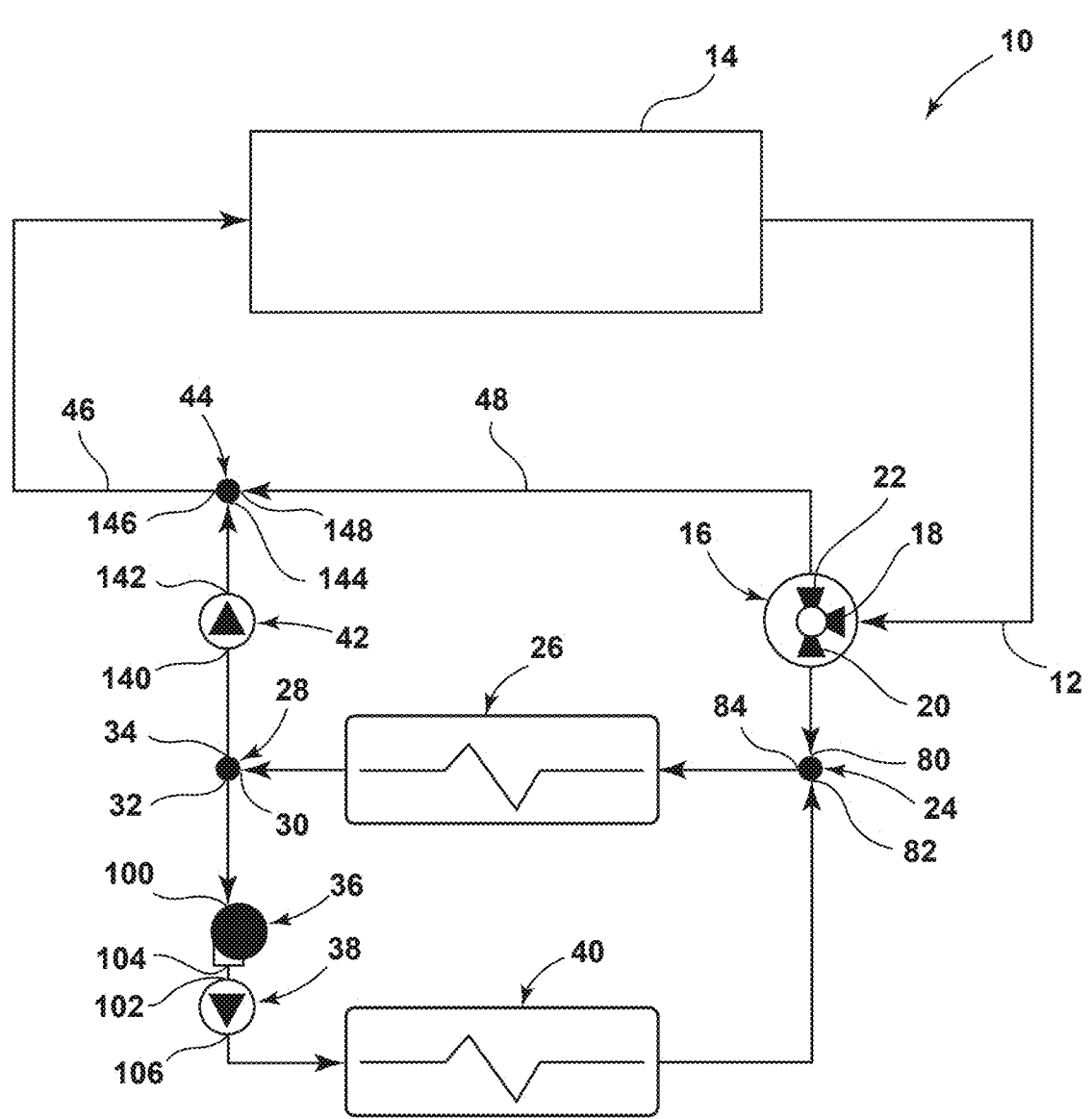
FIG. 1 is a schematic representation of a functional block coupled to a vehicle system.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a functional block for a vehicle. Accordingly, the apparatus components and method steps have been represented, where appropriate, second valve outlet by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-11, reference numeral 10 generally designates a coolant loop or a thermal functional block. The functional block 10 includes a functional block inlet 12 coupled to a vehicle system 14. A three-way valve 16 includes a valve inlet 18, a first valve outlet 20 and a second valve outlet 22. The valve inlet 18 is coupled to the functional block inlet 12. The first outlet 20 of the three-way valve 16 is coupled to a first coupling point 24. A first heat exchanger 26 is coupled to the first coupling point 24. A splitter 28 includes a splitter inlet 30, a first splitter outlet 32, and a second splitter outlet 34. The first heat exchanger 26 is coupled to the splitter inlet 30. A pump 36 is coupled to the first splitter outlet 32. A first check valve 38 is coupled to the pump 36. A second heat exchanger 40 is coupled to the first check valve 38 and the first coupling point 24. A second check valve 42 is coupled to the second splitter outlet 34. A second coupling point 44 is coupled to the second check valve 42. A functional block outlet 46 is coupled to the second coupling point 44 and the vehicle system 14. The second valve outlet 22 of the three-way valve 16 is coupled to the second coupling point 44 via a bypass 48.

Referring to FIG. 1, in various examples, the functional block 10 may be employed in a vehicle. In some examples, the vehicle may be a motor vehicle. A coolant or a first heat transfer fluid generally flows from the vehicle system 14, through the functional block 10, and returns to the vehicle system 14. The vehicle system 14 may include an internal combustion engine, a battery system, a hybrid system, or other vehicle systems. The coolant enters the functional block 10 via the functional block inlet 12. The coolant then flows through the functional block 10 through a variety of paths, as discussed further herein. Finally, the coolant exits the functional block 10 via the functional block outlet 46.

The functional block 10 includes the three-way valve 16 that includes the inlet 18, the first valve outlet 20, and the second valve inlet 22. The three-way valve 16 may be configured to direct the coolant from the inlet 18 to the first valve outlet 20, to the second valve outlet 22, or to the first valve outlet 20 and the second valve outlet 22. In some implementations, the three-way valve 16 may be a T-port three-way valve. The three-way valve 16 may be actuated to distribute a ratio of the coolant flow from the inlet 18 between the first valve outlet 20 and the second valve outlet 22. In some implementations, the ratio of coolant flow may be adjusted by adjusting the three-way valve 16. In other implementations, the ratio of coolant flow may be consistent when the three-way valve 16 directs the coolant to both the first and second valve outlets 20, 22.

The first coupling point 24 may be coupled to and positioned downstream of the first valve outlet 20. In some implementations, the first coupling point 24 may be positioned immediately downstream of the first valve outlet 20 of the three-way valve 16. The term "coupling point," as used herein, may refer to a convergence point where two or more paths come together, with fewer paths extending from the coupling point than the number of paths that lead to the coupling point. The first coupling point 24 is generally a passive three-way junction allowing two flows of the coolant to combine into a single flow of the coolant. However, in some implementations, the first coupling point 24 may be a three-way valve. As illustrated, the first coupling point 24 includes a first inlet 80 for the coolant, a second inlet 82 for the coolant, and an outlet 84 for the coolant. The first inlet 80 is coupled to the first valve outlet 20 of the three-way valve 16.

The first heat exchanger 26 is coupled to and positioned downstream of the first coupling point 24. In some implementations, the first heat exchanger 26 may be coupled to and positioned immediately downstream of the first coupling point 24. The first heat exchanger 26 is coupled to and positioned upstream of the splitter 28. The first heat exchanger 26 generally includes a first side 90 and a second side 92 configured to allow heat transfer between fluids flowing through each of the sides 90, 92. The coolant may flow through the first side 90 of the first heat exchanger 26 and a second heat transfer fluid may flow through the second side 92 of the first heat exchanger 26. The second heat transfer fluid may be a liquid, a gas, or a mixture of liquid and gas. The first heat exchanger 26 is generally configured for transferring heat between the coolant and the second heat transfer fluid flowing through the respective sides 90, 92 of the first heat exchanger 26. An inlet 94 of the first side 90 of the first heat exchanger 26 may be coupled to the outlet 84 of the first coupling point 24.

Referring still to FIG. 1, the first heat exchanger 26 may be coupled to and positioned immediately upstream of the splitter 28. Stated differently, the splitter 28 may be coupled to and positioned downstream or immediately downstream of the first heat exchanger 26. An outlet 96 of the first side 90 of the first heat exchanger 26 may be coupled to splitter 28. The outlet 96 of the first side 90 may be coupled to the splitter inlet 30. The term "branching point" or "splitter," as used herein, may refer to a divergence point where one path splits into two or more paths, with a greater number of paths extending from the splitter 28 than the number of paths that lead to the splitter. The splitter 28 splits the coolant between the first splitter outlet 32 and the second splitter outlet 34. However, the ratio of coolant split between the first splitter outlet 32 and the second splitter outlet 34 may not be a one-to-one ratio. The ratio of coolant split between the first splitter outlet 32 and the second splitter outlet 34 may be controlled by the pump 36 by varying the flow through the first splitter outlet 32.

The pump 36 is coupled to and positioned downstream of the splitter 28. In some implementations, the pump 36 is coupled to and positioned immediately downstream of the splitter 28. An inlet 100 of the pump 36 may be coupled to the first splitter outlet 32. The pump 36 is generally configured to circulate and move the coolant disposed within the pipes of the functional block 10.

The first check valve 38 is coupled to and positioned downstream of the pump 36. In some implementations, the first check valve 38 is coupled to and positioned immediately downstream of the pump 36. An inlet 102 of the first check valve 38 is coupled to an outlet 104 of the pump 36. The first check valve 38 is generally configured to allow flow of the coolant from the inlet 102 to an outlet 106 of the first check valve 38 and prevent flow of the coolant from the outlet 106 to the inlet 102 of the first check valve 38. Stated differently, the first check valve 38 allows for coolant flow in a single direction, from the inlet 102 to the outlet 106.

Referring still to FIG. 1, the second heat exchanger 40 is coupled to and positioned downstream of the first check valve 38. In some implementations, the second heat exchanger 40 may be coupled to and positioned immediately downstream of the first check valve 38. The second heat exchanger 40 generally includes a first side 120 and a second side 122 configured to allow heat to transfer between fluids flowing through each of the sides 120, 122. The coolant from the first check valve 38 may flow through the first side 120 of the second heat exchanger 40 and a third heat transfer fluid may flow through the second side 122 of the second heat exchanger 40. The third heat transfer fluid may be a liquid, a gas, or a mixture of liquid and gas. The second heat exchanger 40 is generally configured for transferring heat between the coolant and the second heat transfer fluid flowing through the respective sides 120, 122 of the second heat exchanger 40.

An inlet 124 of the first side 120 of the second heat exchanger 40 may be coupled to the outlet 106 of the first check valve 38. The second heat exchanger 40 may be coupled to and positioned immediately upstream of the first coupling point 24. Stated differently, the first coupling point 24 may be coupled to and positioned downstream or immediately downstream of the second heat exchanger 40. An outlet 126 of the first side 120 of the second heat exchanger 40 may be coupled to first coupling point 24. The outlet 126 of the first side 120 may be coupled to the second inlet 82 of the first coupling point 24.

The splitter 28 may be coupled to and positioned upstream of the second check valve 42. In some implementations, the splitter 28 may be coupled to and positioned immediately upstream of the second check valve 42. Stated differently, the second check valve 42 may be coupled to and positioned upstream or immediately upstream of the splitter 28. The second splitter outlet 34 may be coupled to an inlet 140 of the second check valve 42. An outlet 142 of the second check valve 42 may be coupled to a first inlet 144 of the second coupling point 44. The second check valve 42 is generally configured to allow flow of the coolant from the inlet 140 to an outlet 142 of the second check valve 42 and prevent flow of the coolant from the outlet 142 to the inlet 140 of the second check valve 42.

In other implementations, the splitter 28 may be coupled to and positioned immediately upstream of the second coupling point 44. In such implementations, the second splitter outlet 34 may be coupled to the first inlet 144 of the second coupling point 44. The second coupling point 44 is generally a passive three-way junction allowing two flows of the coolant to combine into a single flow of the coolant. However, in some implementations, the second coupling point 44 may be a three-way valve. As illustrated, the second coupling point 44 includes the first inlet 144, the second inlet 148, and the outlet 146 for the coolant.

The functional block outlet 46 is coupled to and positioned downstream of the second coupling point 44 to allow for coolant to exit from the functional block 10. The functional block outlet 46 may be coupled to a vehicle system 14. The functional block outlet 46 may be coupled to an outlet 146 of the second coupling point 44. The bypass 48 may be coupled to the outlet 84 of the three-way valve 16 to extend to a second inlet 148 of the second coupling point 44.

Figure 2:
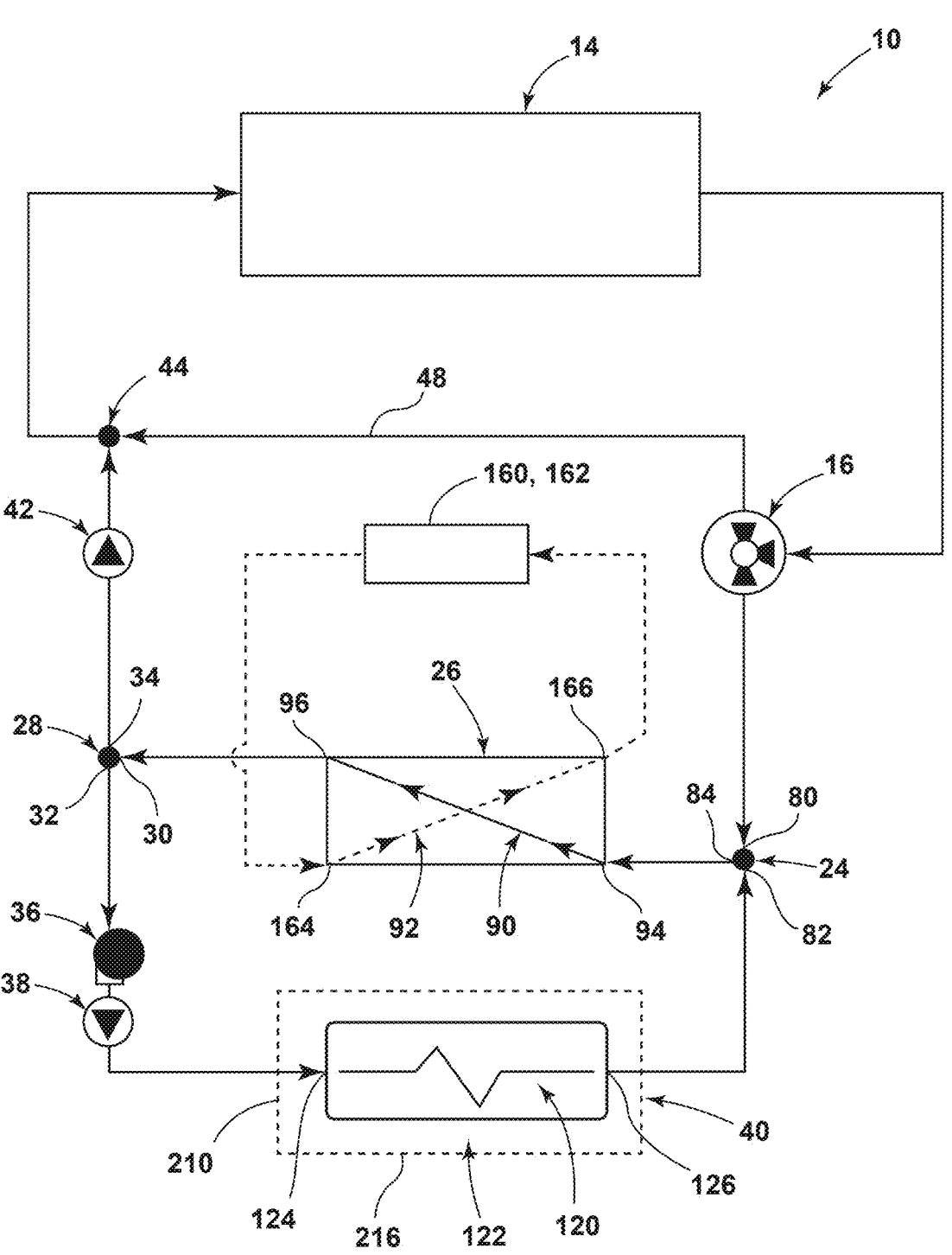
FIG. 2 is a schematic representation of a functional block including a first heat exchanger coupled to a heating source or a cooling source and a second heat exchanger disposed in ductwork of an HVAC system.
Figure 3:
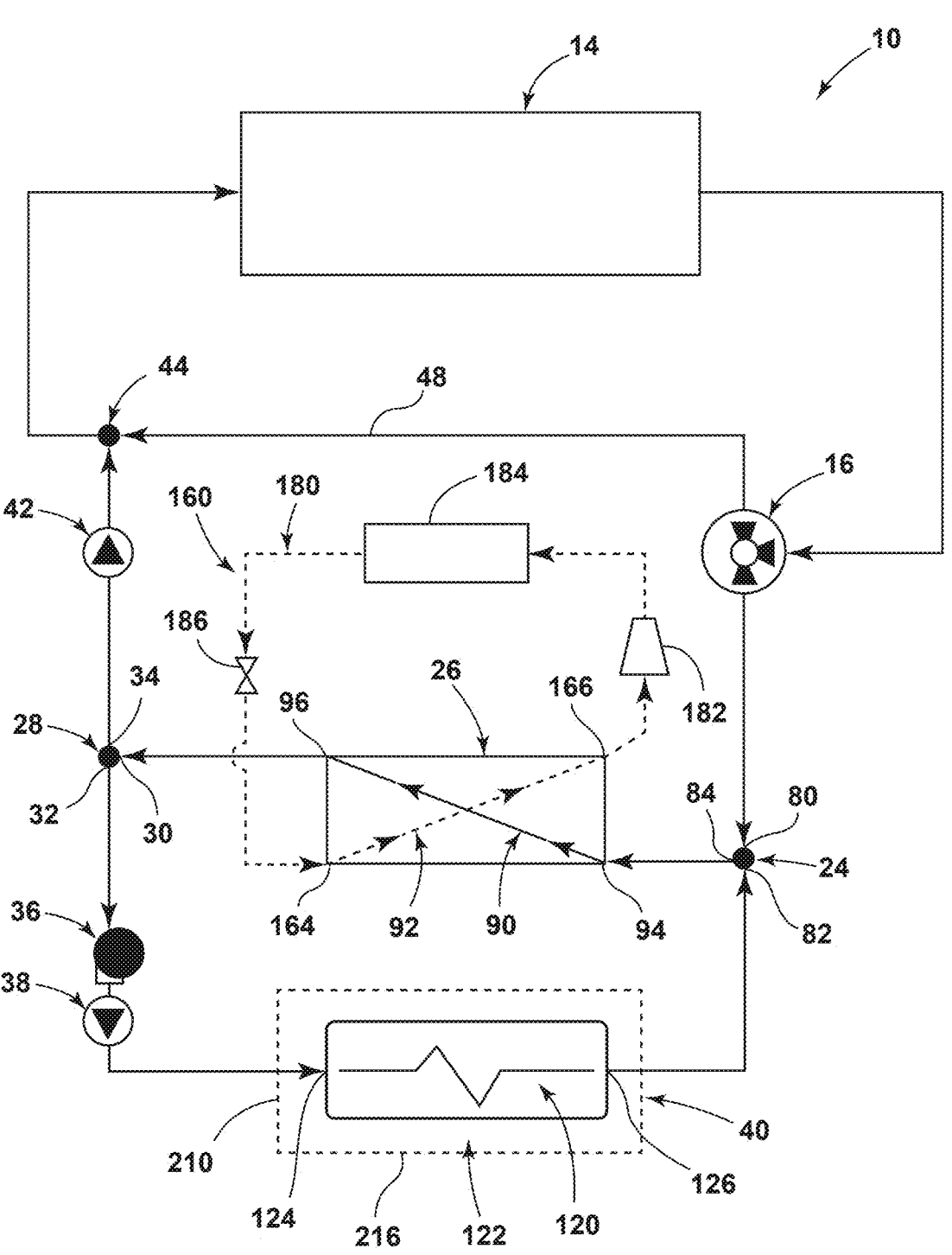
FIG. 3 is a schematic representation of a functional block including a first heat exchanger coupled to a refrigeration loop and configured as an evaporator, and a second heat exchanger disposed in ductwork of an HVAC system.

Referring to FIGS. 2 and 3, the first heat exchanger 26 may be configured to heat or cool the coolant flowing through the first side 90. Stated differently, the first heat exchanger 26 may be configured to heat or cool the second heat transfer fluid flowing through the second side 92. The first heat exchanger 26 may be coupled to a cooling source 160 to cool the coolant flowing through the first side 90 of the first heat exchanger 26 or coupled to a heating source 162 to heat the coolant flow through the first heat exchanger 26. The cooling source 160 or the heating source 162 are generally coupled to the second side 92 of the first heat exchanger 26. The cooling source 160 or the heating source 162 may be coupled to an inlet 164 of the second side 92 and an outlet 166 of the second side 92, allowing the second heat transfer fluid to flow through the second side 92 of the first heat exchanger 26.

In implementations including the cooling source 160, the cooling source 160 is generally configured to circulate the second heat transfer fluid through the second side 92 of the first heat exchanger 26 and through the cooling source 160. To cool the coolant flowing through the first side 90 of the first heat exchanger 26, the second heat transfer fluid has a lower temperature than the coolant at the inlet 164 and has a higher temperature at the outlet 166 than the second heat transfer fluid entering the second side 92 at the inlet 164.

In some implementations, the cooling source 160 may be a portion of a refrigeration loop 180, as illustrated in FIG. 3, with the second side 92 of the first heat exchanger 26 being configured as an evaporator of the refrigeration loop 180. The second heat transfer fluid disposed within the refrigeration loop 180 may be a refrigerant. The refrigeration loop 180 may include a compressor 182, a condenser 184, an expansion valve 186, and the second side 92 of the first heat exchanger 26 configured as an evaporator. Heat from the coolant is transferred to the refrigerant within the first heat exchanger 26.

In implementations including the heating source 162, the heating source 162 is generally configured to circulate the second heat transfer fluid through the second side 92 of the first heat exchanger 26. To heat the coolant flowing through the first side 90 of the first heat exchanger 26, the second heat transfer fluid has a higher temperature than the coolant at the inlet 164 and has a lower temperature at the outlet 166 than the second heat transfer fluid entering the second side 92 at the inlet 164.

Figure 4:
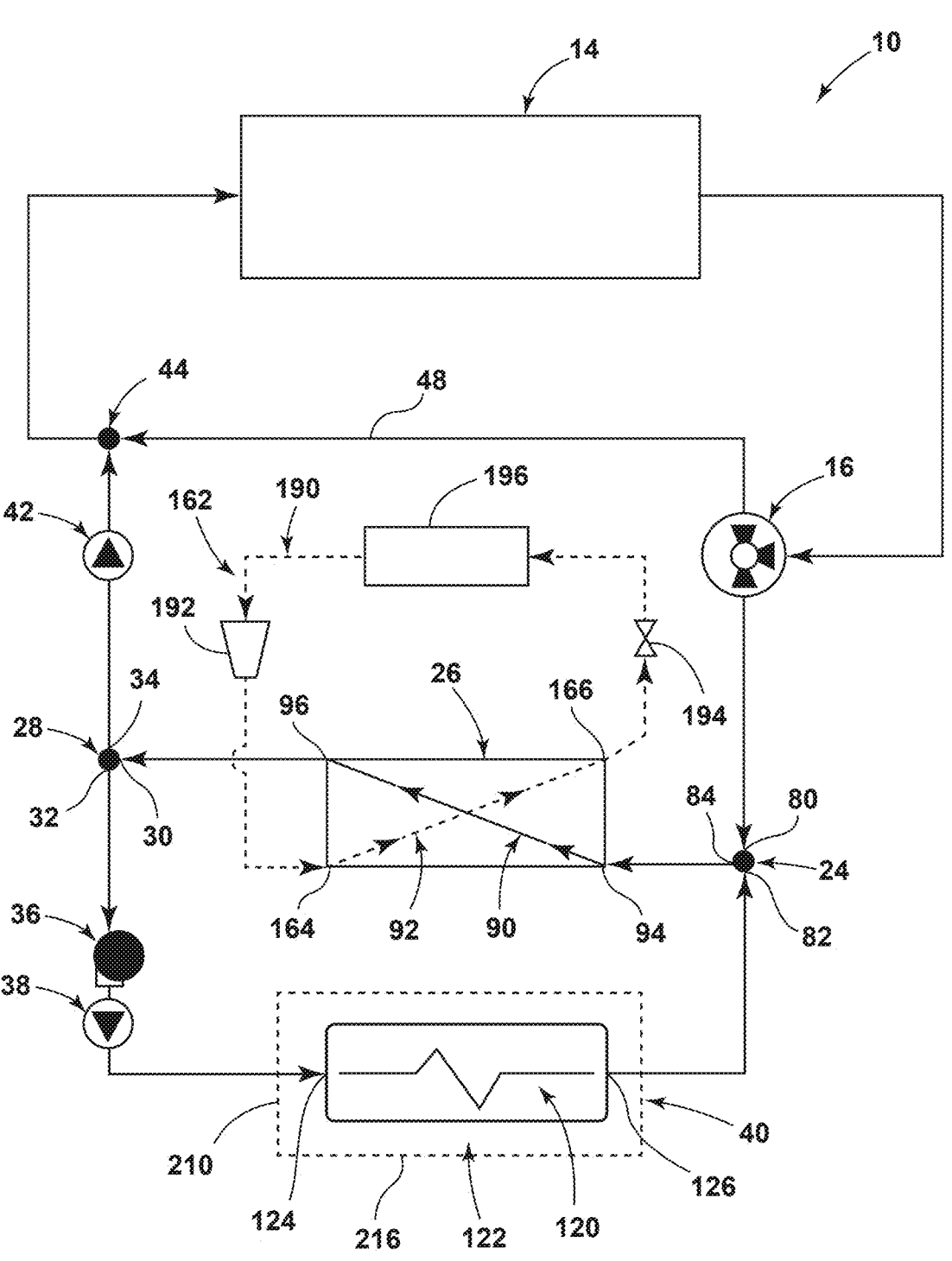
FIG. 4 is a schematic representation of a functional block including a first heat exchanger coupled to a refrigeration loop and configured as a condenser, and a second heat exchanger disposed in ductwork of an HVAC system.

In some implementations, the heating source 162 may be a refrigeration loop as illustrated in FIG. 4, with the second side 92 of the first heat exchanger 26 being configured as a condenser of the refrigeration loop 190. The second heat transfer fluid disposed within the refrigeration loop 190 may be a refrigerant. The refrigeration loop 190 may include a compressor 192, the second side 92 of the first heat exchanger 26 configured as a condenser, an expansion valve 194, and an evaporator 196. Heat from the refrigerant is transferred to the coolant within the first heat exchanger 26.

Figure 5:
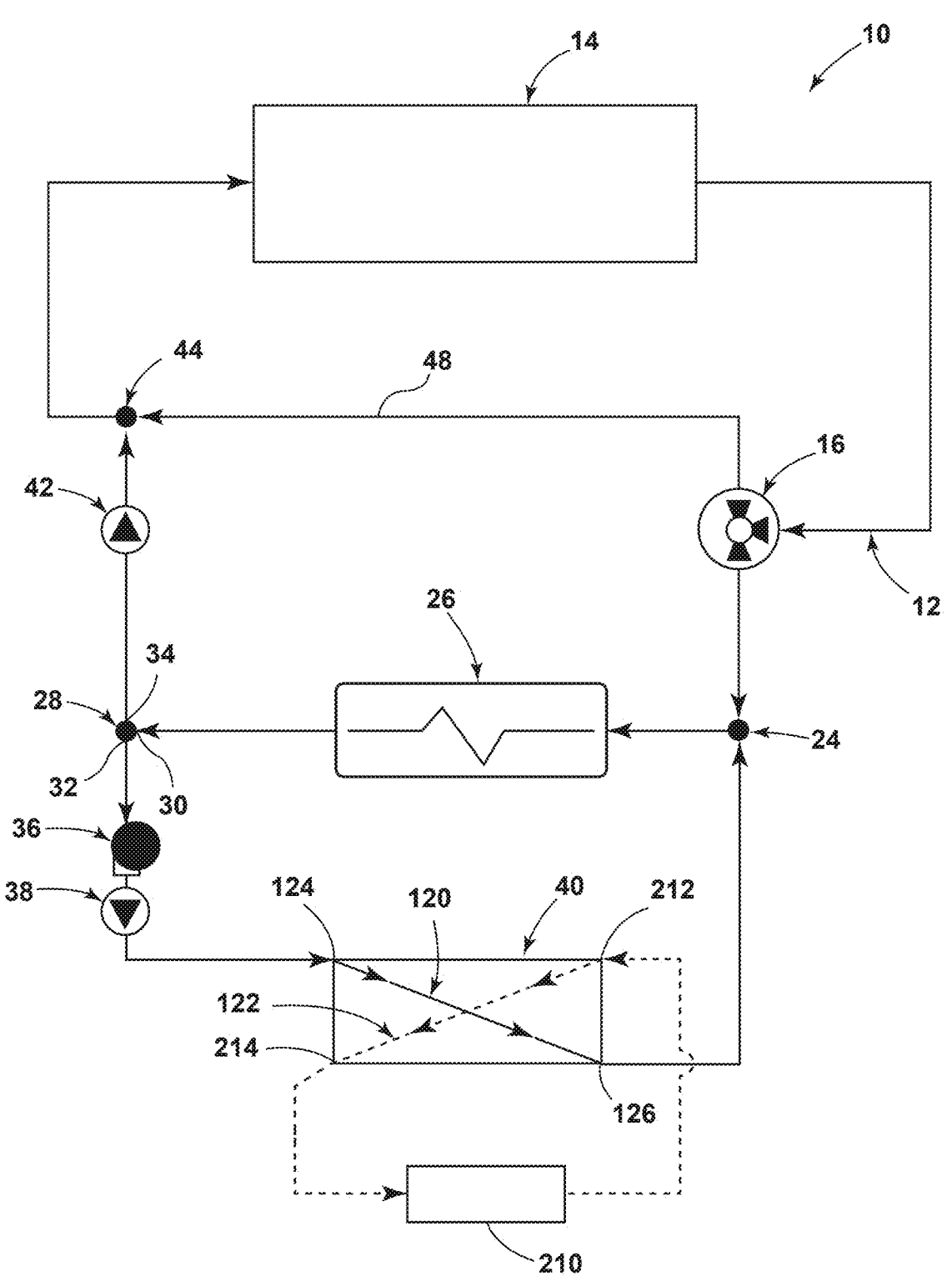
FIG. 5 is a schematic representation of a functional block including a heat exchanger disposed and coupled to a secondary vehicle system.

Referring still to FIGS. 2-4, and now also FIG. 5, the second heat exchanger 40 may be coupled to a secondary vehicle system 210. In some implementations, the second heat exchanger 40 may be coupled to the secondary vehicle system 210 that may need a heating or a cooling load. The second side 122 of the second heat exchanger 40 may include the third heat transfer fluid flowing between the second heat exchanger 40. The secondary vehicle system 210 may be coupled to an inlet 212 and an outlet 214 of the second side 122 of the second heat exchanger 40.

In other implementations, the second heat exchanger 40 is a liquid to air heat exchanger and the secondary vehicle system 210 is a Heating, Ventilation, and Air Conditioning (HVAC) system. The second heat exchanger 40 can be in fluid communication with ductwork 216 of the HVAC system. Stated differently, the second side 122 of the second heat exchanger 40 may be in fluid communication of the ductwork 216 of the HVAC system. Accordingly, the second heat exchanger 40 may be employed to alter a temperature and/or a humidity of ambient air and provide temperature-controlled and/or humidity-controlled air to an environment (e.g., a cabin of a vehicle). For example, the second heat exchanger 40 may be a heater core to heat the cabin of the vehicle or a cooler core to cool the cabin of the vehicle.

Referring to FIGS. 6-11, the vehicle functional block 10 includes various operation modes for directing the coolant to provide a cooling load or a heating load to the vehicle system 14 and/or the secondary vehicle system 210 coupled to or in fluid communication with the second heat exchanger 40. The three-way valve 16 and the pump 36 can be adjusted to alter and control the flow of the coolant through the vehicle functional block 10. The flow through the vehicle functional block 10 may be adjusted depending on cooling or heating needs of the vehicle system 14.

The three-way valve 16 is generally used for coarse flow control of the coolant from the functional block inlet 12 between the bypass 48 and the first heat exchanger 26. The three-way valve 16 may be actuated between a first position 220 or an open position 220, a second position 222 or a bypass position 222, and a third position 224 or an open-bypass position 224. The first position 220 directs flow of the coolant from the functional block inlet 12 to the first outlet 20 of the three-way valve 16 (i.e., to the first heat exchanger 26). The second position 222 directs flow of the coolant from the functional block inlet 12 to the second outlet 22 of the three-way valve 16 (i.e., to the bypass 48). The third position 224 directs flow of the coolant from the function block inlet 12 to both the first outlet 20 and the second outlet 22 of the three-way valve 16. In some implementations, the three-way valve 16 may act as a splitter when the three-way valve 16 is in third position 224. In other implementations, the three-way valve 16 may be used for fine control of splitting flow between the bypass 48 and the first heat exchanger 26 in the third position 224.

The pump 36 may be used for fine control of flow of the coolant from the first heat exchanger 26 between the second heat exchanger 40 and the functional block outlet 46. The pump 36 generally has an active mode that allows flow of the coolant through the pump 36, and an inactive mode that prevents flow of the coolant through the pump 36. In some implementations, the pump 36 may be a variable speed pump or a multi-speed pump, which allow for variable flows of the coolant through the pump 36 when in the active mode. By adjusting the flow through the pump 36, the amount of cooling or heating provided to the second heat exchanger 40 and/or the vehicle system 14.

Figure 6:
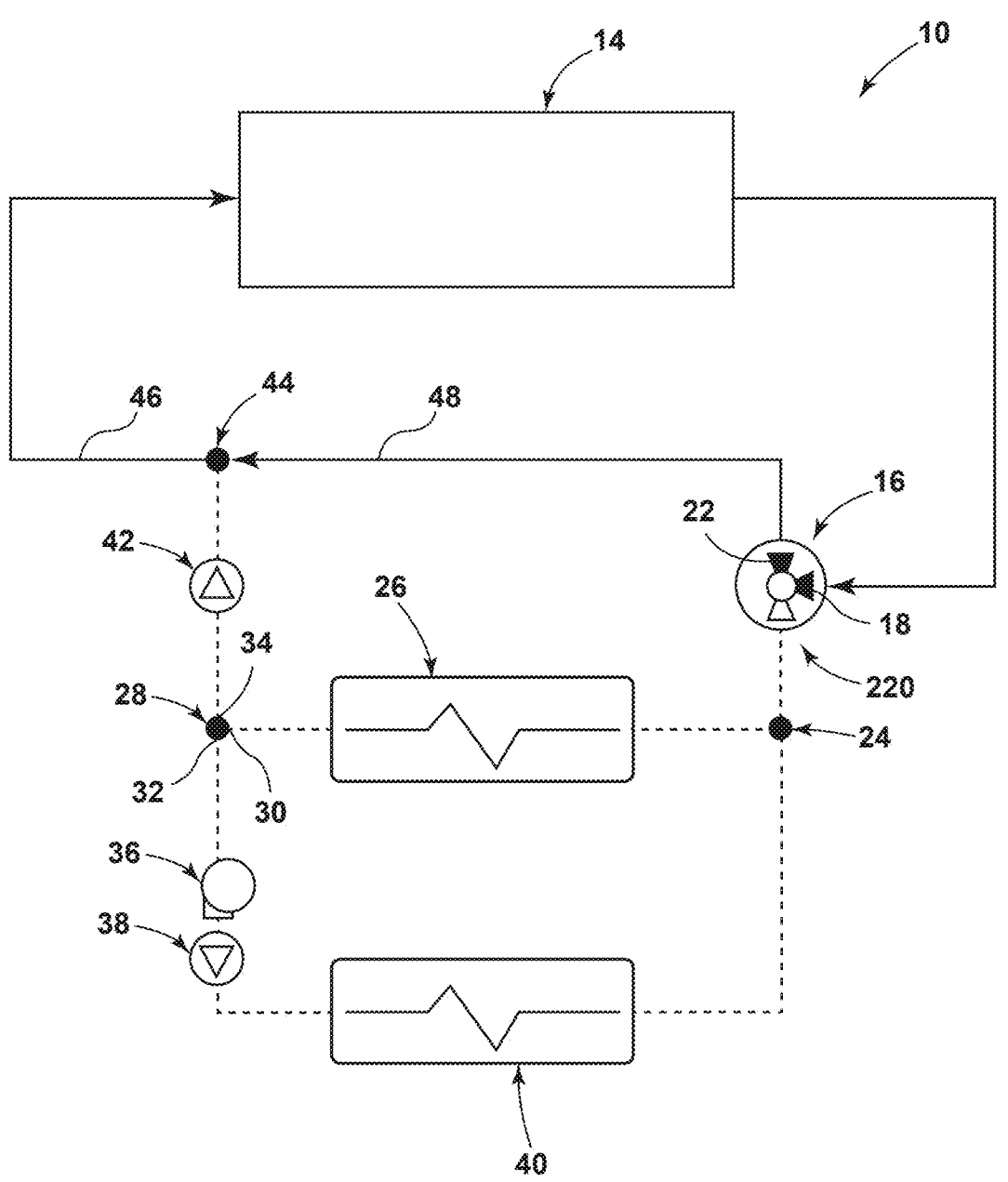
FIG. 6 is a schematic representation of a functional block coupled to a vehicle system in a first operation mode.

Referring to FIG. 6, a schematic of the vehicle functional block 10 in a first operation mode, referred to as a bypass operation mode, is illustrated. In the first operation mode, the three-way valve 16 is in the second position 222 directing the coolant through the bypass 48. By placing the functional block 10 in the first operation mode, the coolant flow from the vehicle system 14 through the functional block inlet 12, through the inlet 18 of the three-way valve 16, through the three-way valve 16, through the second outlet 22 of the three-way valve 16, through the bypass 48, and through the functional block outlet 46 to the vehicle system 14. The first operation mode may be used in situations where the vehicle system 14 does not require any additional heating or cooling.

Figure 7:
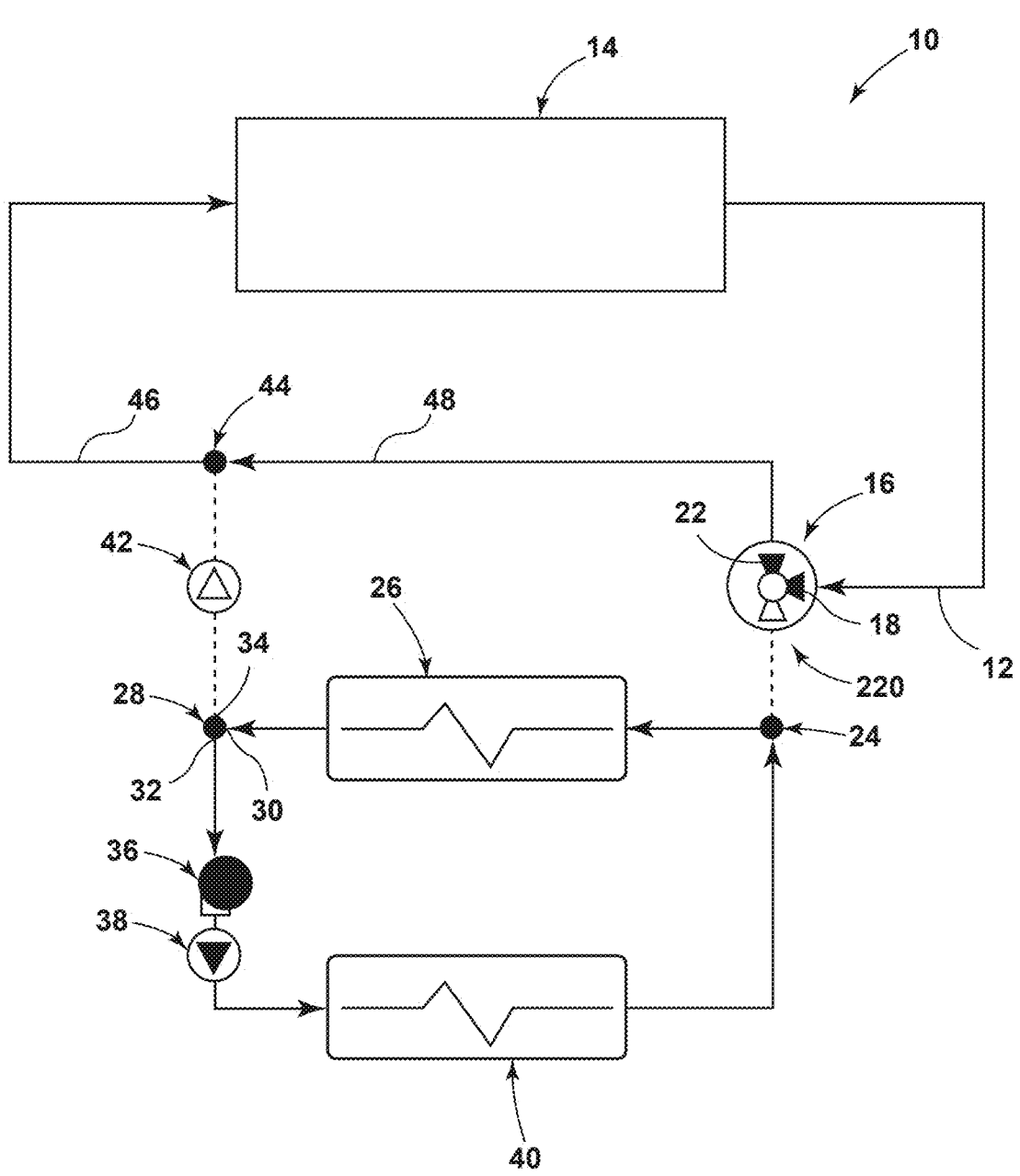
FIG. 7 is a schematic representation of a functional block coupled to a vehicle system in a second operation mode.

Referring to FIG. 7, a schematic of a second operation mode, referred to as a bypass and secondary load operation mode, of the vehicle functional block 10 is illustrated. The second operation mode is similar to the first operation with the three-way valve 16 in the second position 222 directing the coolant through the bypass 48. However, the pump 36 is active to provide a heating or cooling load to the second heat exchanger 40 from the first heat exchanger 26. The pump 36 circulates coolant around from the first heat exchanger 26, through the second heat exchanger 40, and returns the coolant to the first heat exchanger 26.

Figure 8:
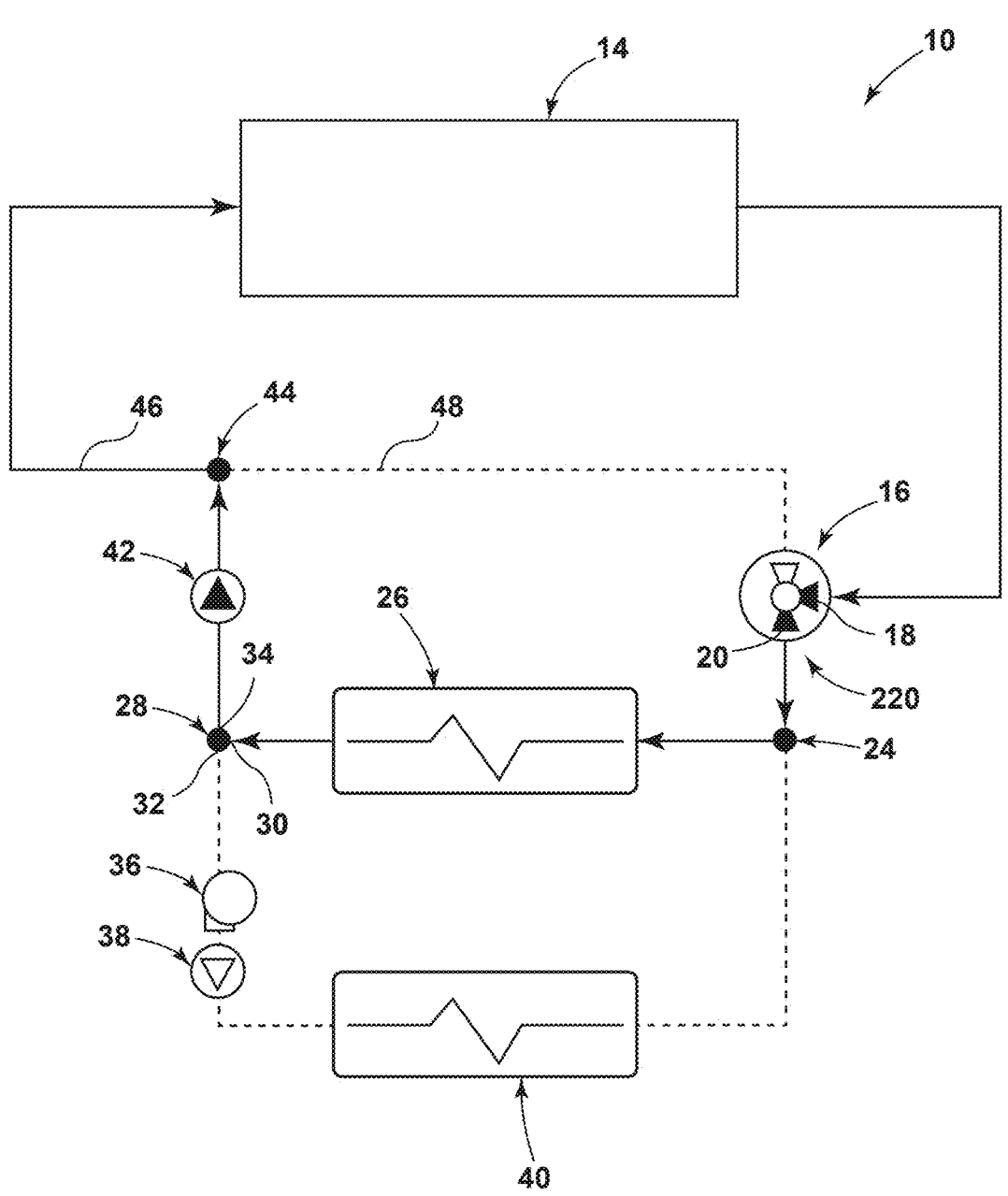
FIG. 8 is a schematic representation of a functional block coupled to a vehicle system in a third operation mode.

Referring to FIG. 8, a schematic of a third operation mode, referred to as a primary load operation mode, of the vehicle functional block 10 is illustrated. The third operation mode is generally configured to provide a heating or a cooling load to the vehicle system 14. The three-way valve 16 is placed in the first position 220 to direct the coolant from the functional block inlet 12 to the first heat exchanger 26. By placing the functional block 10 in the third operating mode, the coolant flows from the vehicle system 14 through the functional block inlet 12, through the inlet 18 of the three-way valve 16, through the three-way valve 16, through the first outlet 20 of the three-way valve 16, through the first coupling point 24, through the first heat exchanger 26, through the splitter 28, and through the functional block outlet 46 to the vehicle system 14. The functional block 10 may flow through the second check valve 42 when the second check valve 42 is included in the functional block 10.

Figure 9:
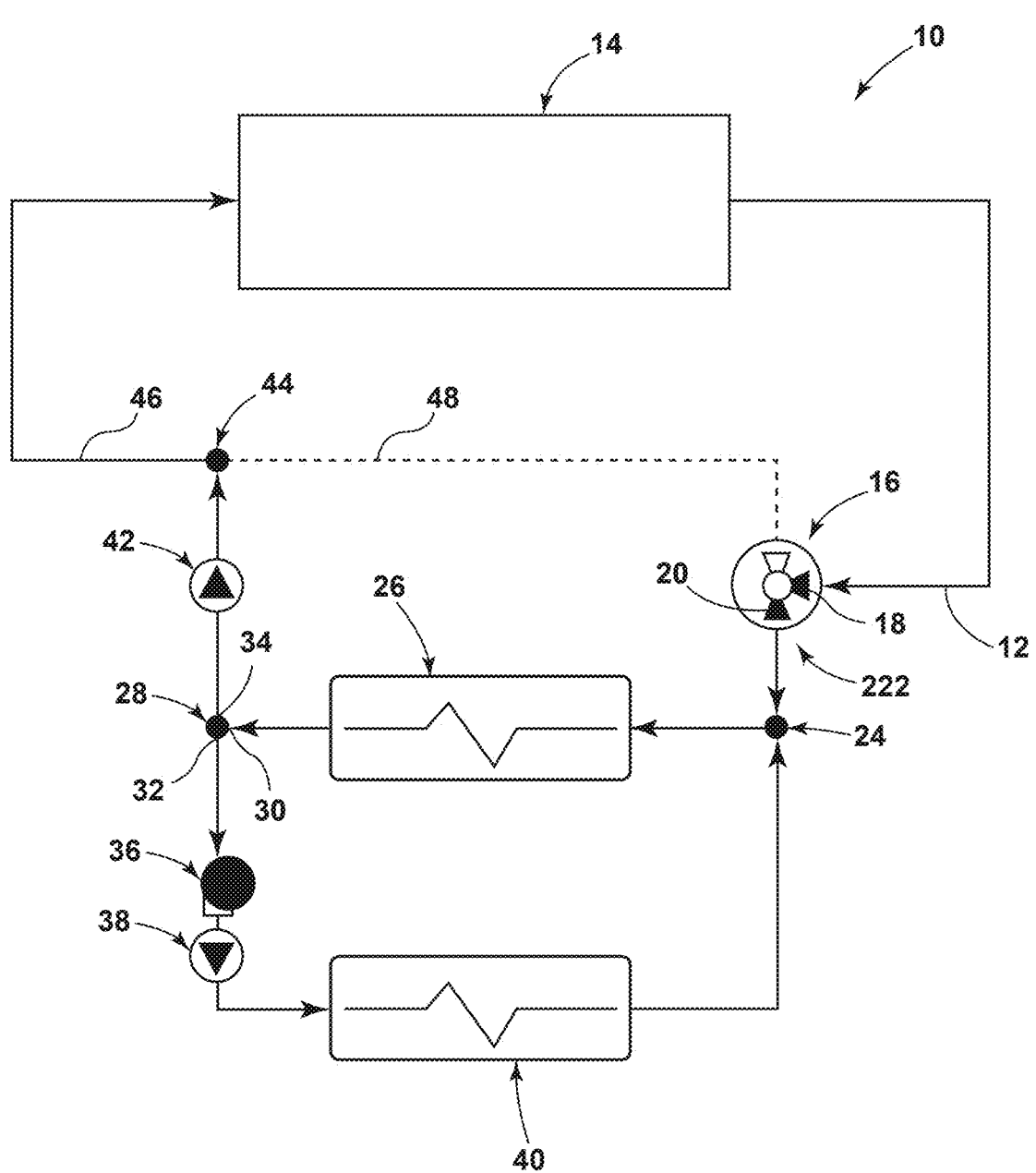
FIG. 9 is a schematic representation of a functional block coupled to a vehicle system in a fourth operation mode.

Referring to FIG. 9, a schematic of a fourth operation mode, referred to as a primary load and secondary load operation mode, of the vehicle functional block 10 is illustrated. The fourth operation mode is generally configured to provide a heating or a cooling load to the vehicle system 14 and the second heat exchanger 40. The three-way valve 16 is placed in the first position 220 to direct the coolant from the functional block inlet 12 to the first heat exchanger 26. The pump 36 is active and directs coolant from the splitter 28 through the second heat exchanger 40. The ratio of flow of coolant between the first splitter outlet 32 and the second splitter outlet 34 may be controlled by the pump 36. By placing the functional block 10 in the fourth operating mode, the coolant flows from the vehicle system 14 through the functional block inlet 12, through the inlet 18 of the three-way valve 16, through the three-way valve 16, through the first outlet 20 of the three-way valve 16, through the first coupling point 24, through the first heat exchanger 26, and to the splitter 28. The coolant flow is split between the first splitter outlet 32 and the second splitter outlet 34. From the first splitter outlet 32, the coolant is circulated by the pump 36, through the first check valve 38, through the second heat exchanger 40, and to the first coupling point 24. From the second splitter outlet 34, the coolant flows to the second coupling point 44, and through the functional block outlet 46 to the vehicle system 14. The coolant may flow from the second splitter outlet 34 through the second check valve 42 when the second check valve 42 is included in the functional block 10.

Figure 10:
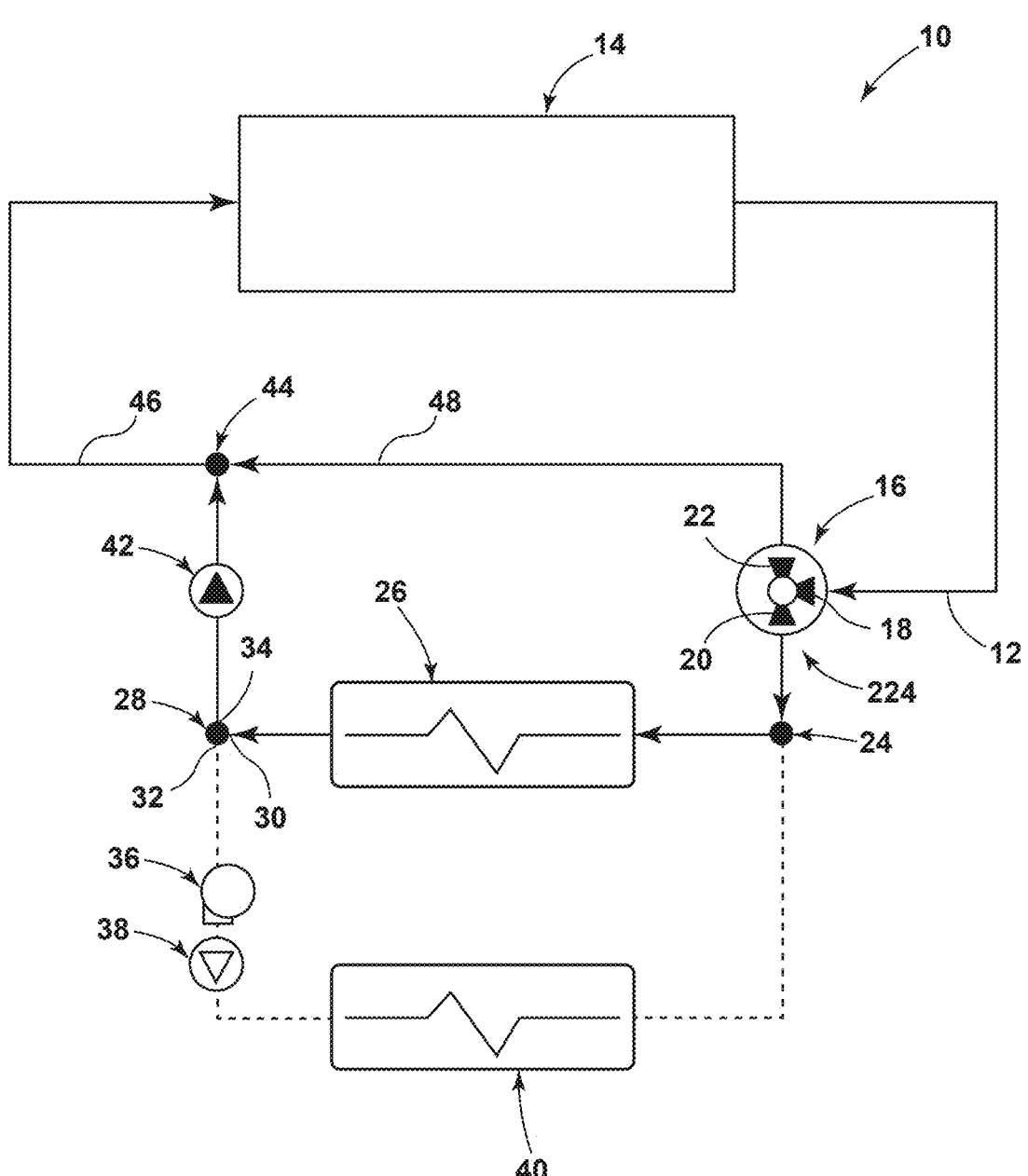
FIG. 10 is a schematic representation of a functional block coupled to a vehicle system in a fifth operation mode.

Referring to FIG. 10, a schematic of a fifth operation mode, referred to as a primary load and bypass operation mode, of the vehicle functional block 10 is illustrated. The fifth operation mode is generally configured to provide a heating or a cooling load to the vehicle system 14 that is less than the maximum heating or cooling load that may be provided by the first heat exchanger 26. The three-way valve 16 is placed in the third position 224 to direct the coolant from the functional block inlet 12 to the bypass 48 and to the first heat exchanger 26. The pump 36 is inactive and prevents flow through. By placing the functional block 10 in the fifth operating mode, the coolant flows from the vehicle system 14 through the functional block inlet 12, through the inlet 18 of the three-way valve 16, and the coolant flow is split between the first outlet 20 and the second outlet 22 of the three-way valve 16. From the first outlet 20 of the three-way valve 16, the coolant flows through the first coupling point 24, through the first heat exchanger 26, through the second coupling point 44, through the functional block outlet 46, and to the vehicle system 14. From the second outlet 22 of the three-way valve 16, the coolant flows through the bypass 48, through the second coupling point 44, through the functional block outlet 46, and to the vehicle system 14. The coolant may flow from the second splitter outlet 34 through the second check valve 42 when the second check valve 42 is included in the functional block 10.

Figure 11:
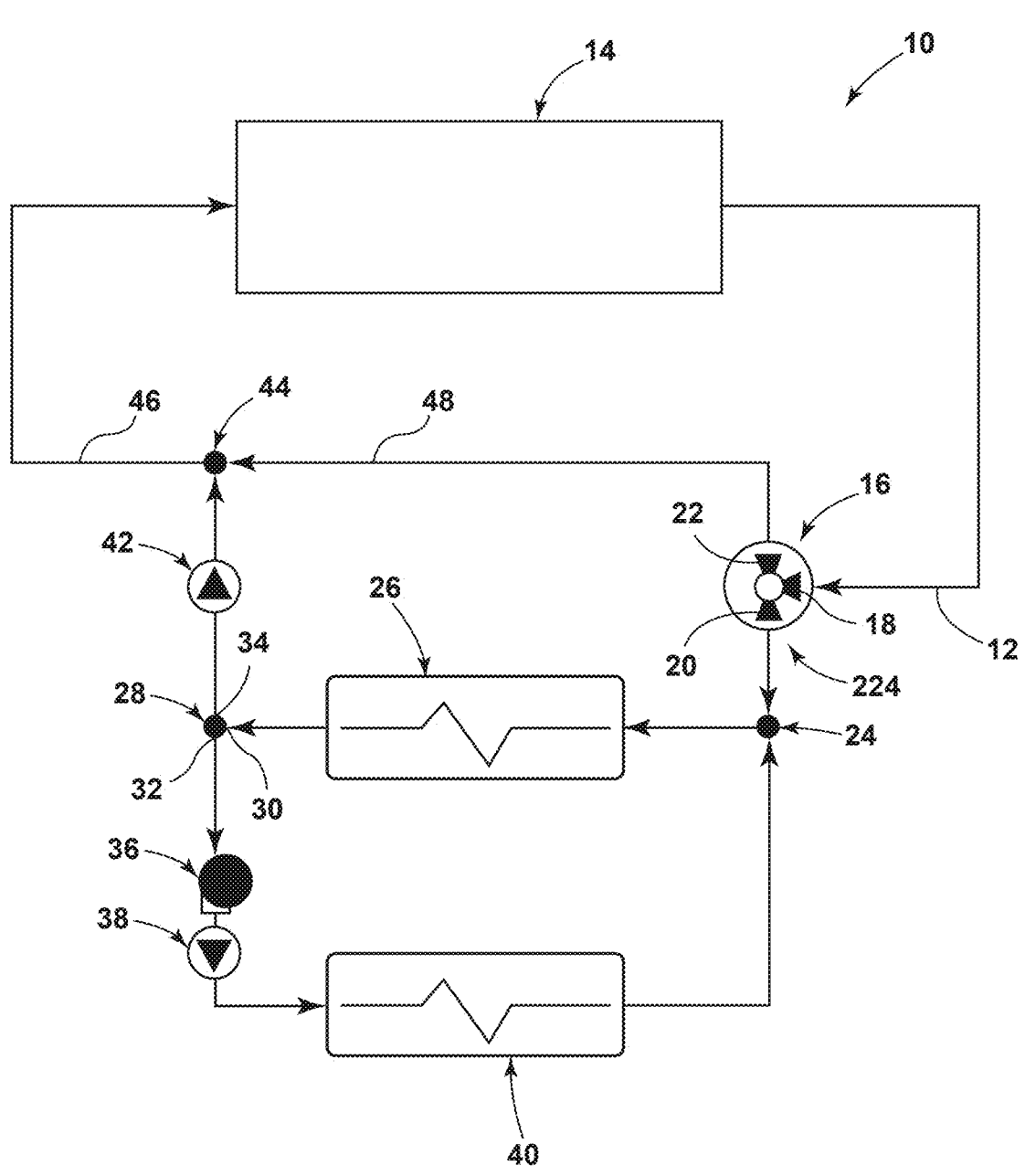
FIG. 11 is a schematic representation of a functional block coupled to a vehicle system in a sixth operation mode.

Referring to FIG. 11, a schematic of a sixth operation mode, referred to as a primary load, secondary load, and bypass operation mode, of the vehicle functional block 10 is illustrated. The sixth operation mode is generally configured to provide a heating or a cooling load to the vehicle system 14 that is less than the maximum heating or cooling load that may be provided by the first heat exchanger 26 and to provide a heating or a cooling load to the second heat exchanger 40. The three-way valve 16 is placed in the third position 224 to direct the coolant from the functional block inlet 12 to the bypass 48 and to the first heat exchanger 26. The pump 36 is active and directs flow through the second heat exchanger 40. By placing the functional block 10 in the fifth operating mode, the coolant flows from the vehicle system 14 through the functional block inlet 12, through the inlet 18 of the three-way valve 16, and the coolant flow is split between the first outlet 20 and the second outlet 22 of the three-way valve 16. From the second outlet 22 of the three-way valve 16, the coolant flows through the bypass 48, through the second coupling point 44, through the functional block outlet 46, and to the vehicle system 14. From the first outlet 20 of the three-way valve 16, the coolant flows through the first coupling point 24, through the first heat exchanger 26, through the second coupling point 44, and to the splitter 28. The coolant flow is split between the first splitter outlet 32 and the second splitter outlet 34. From the first splitter outlet 32, the coolant is circulated by the pump 36, through the first check valve 38, through the second heat exchanger 40, and to the first coupling point 24. From the second splitter outlet 34, the coolant flows to the second coupling point 44, and through the functional block outlet 46 to the vehicle system 14. The coolant may flow through the second check valve 42 when the second check valve 42 is included in the functional block 10.

The present disclosure has discussed a variety of modes of operation for the functional block 10. While a specific example of the functional block 10 and specific examples of the modes of operation of the functional block 10 have been discussed in detail, the present disclosure is not limited to the arrangement of the functional block 10 discussed herein. Similarly, the present disclosure is not limited to the modes of operation discussed herein. Rather, the present disclosure provides exemplary discussion of the operation of the various components of the functional block 10 that may inform additional modes of operation and/or arrangements that are not explicitly articulated herein.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A thermal functional block for a vehicle, comprising:
a functional block inlet coupled to a vehicle system;
a three-way valve including a valve inlet, a first valve outlet and a second valve outlet, wherein the valve inlet is coupled to and positioned downstream of the functional block inlet;
a first coupling point positioned downstream of the first valve outlet;
a first heat exchanger positioned immediately downstream of the first coupling point;
a splitter having a splitter inlet, a first splitter outlet, and a second splitter outlet, wherein the splitter inlet is coupled to and positioned immediately downstream of the first heat exchanger;

a pump coupled to and downstream of the first splitter outlet;
a first check valve positioned downstream of the pump;
a second heat exchanger positioned immediately downstream of the first check valve, wherein the first coupling point is downstream of the second heat exchanger, and wherein the second heat exchanger is positioned immediately upstream of the first coupling point;
a second check valve positioned downstream of the second outlet of the splitter, wherein the splitter is positioned immediately upstream of the second check valve;
a second coupling point positioned downstream of the second check valve, wherein a first inlet of the second coupling point is coupled to an outlet of the second check valve;
a functional block outlet coupled to the vehicle system and downstream of the second coupling point; and
a bypass coupled to the second outlet of the three-way valve and to the second coupling point;
wherein a coolant flows from the vehicle system, through the thermal functional block, and to the vehicle system.

2. The thermal functional block of claim 1, wherein the thermal functional block includes a bypass operating mode, and wherein when the thermal functional block is in the bypass operation mode the three-way valve is in a bypass position allowing for flow of the coolant from the functional block inlet to flow through the valve inlet to the second valve outlet, and from the second valve outlet flows through the bypass to the functional block outlet.

3. The thermal functional block of claim 1, wherein the thermal functional block includes a bypass and secondary load operation mode, and wherein when the thermal functional block is in the bypass and secondary load operation mode the three-way valve is in a bypass position allowing for flow of the coolant from the functional block inlet to flow through the valve inlet to the second valve outlet, the flow of the coolant from the second valve outlet flows through the bypass to the functional block outlet, and further wherein when the thermal functional block is in the bypass and secondary load operation mode the pump is active to circulate the coolant from the pump, to the second heat exchanger, to the first heat exchanger, and returned to the pump.

4. The thermal functional block of claim 1, wherein the thermal functional block includes a primary load operation mode, and wherein when the thermal function block is in the primary load operation mode the three-way valve is in an open position allowing for flow of the coolant from the functional block inlet to flow through the valve inlet to the first valve outlet, the flow of the coolant from the first valve outlet flows through the first heat exchanger and to the thermal functional block outlet, and further wherein the pump is inactive and prevents flow of the coolant through the pump and to the second heat exchanger when the thermal function block is in the primary load operation mode.

5. The thermal functional block of claim 1, wherein the thermal functional block includes a primary load and secondary load operation mode, and wherein when the thermal function block is in the primary load and secondary load operation mode the three-way valve is in an open position allowing for flow of the coolant from the functional block inlet to flow through the valve inlet to the first valve outlet, the flow of the coolant from the first valve outlet flows through the first heat exchanger and to the thermal functional block outlet, and further wherein when the thermal functional block is in the primary load and secondary load operation mode the pump is active to circulate the coolant from the pump, to the second heat exchanger, to the first heat exchanger, and returned to the pump.

6. The thermal functional block of claim 1, wherein the thermal functional block includes a primary load and bypass operation mode, and wherein when the thermal function block is in the primary load and bypass operation mode the three-way valve is in an open-bypass position allowing for flow of the coolant from the functional block inlet to flow through the valve inlet to the first valve outlet and the second valve outlet, the flow of the coolant from the first valve outlet flows through the first heat exchanger and to the thermal functional block outlet, and the flow of the coolant from the second valve outlet flows through the bypass to the functional block outlet, and further wherein the pump is inactive and prevents flow of the coolant through the pump and to the second heat exchanger when the thermal function block is in the primary load and bypass operation mode.

7. The thermal functional block of claim 1, wherein the thermal functional block includes a primary load, secondary load, and bypass operation mode, and wherein when the thermal function block is in the primary load, secondary load, and bypass operation mode the three-way valve is in an open-bypass position allowing for flow of the coolant from the functional block inlet to flow through the valve inlet to the first valve outlet and the second valve outlet, the flow of the coolant from the first valve outlet flows through the first heat exchanger and to the thermal functional block outlet, and the flow of the coolant from the second valve outlet flows through the bypass to the functional block outlet, and further wherein when the thermal functional block is in the primary load, secondary load, and bypass operation mode the pump is active to circulate the coolant from the pump, to the second heat exchanger, to the first heat exchanger, and returned to the pump.

8. The thermal functional block of claim 1, wherein the second heat exchanger is disposed within ductwork of a heating, ventilation, and air conditioning of said vehicle.

9. The thermal functional block of claim 8, wherein the second heat exchanger is configured as a heater core for the heating, ventilation, and air conditioning system.

10. The thermal functional block of claim 8, wherein the second heat exchanger is configured as a cooler core for the heating, ventilation, and air conditioning system.

11. The thermal functional block of claim 1, wherein the first heat exchanger is a condenser of a refrigeration system.

12. The functional block of claim 1, wherein the first heat exchanger is an evaporator of a refrigeration system.

13. A thermal functional block for a vehicle, comprising:
a functional block inlet configured to be coupled to a vehicle system;
a three-way valve including a valve inlet, a first valve outlet and a second valve outlet, wherein the valve inlet is coupled to and positioned downstream of the functional block inlet;
a first coupling point positioned downstream of the first valve outlet;
a first heat exchanger positioned downstream of the first coupling point;
a splitter having a splitter inlet, a first splitter outlet, and a second splitter outlet, wherein the splitter inlet is coupled to and positioned downstream of the first heat exchanger, and the splitter is positioned immediately upstream of a second check valve of the thermal functional block;

a pump coupled to and positioned immediately downstream of the first splitter outlet;
a first check valve positioned immediately downstream of the pump;
a second heat exchanger positioned downstream of the first check valve, wherein the first coupling point is downstream of the second heat exchanger;
a second coupling point positioned downstream of the second splitter outlet;
a functional block outlet coupled to the vehicle system and downstream of the second coupling point; and
a bypass coupled to the second outlet of the three-way valve and to the second coupling point.

14. The thermal functional block of claim 13, further comprising:
a second check valve positioned downstream of the second outlet of the splitter and upstream of the second coupling point.

15. The thermal functional block of claim 13, wherein the three-way valve has a first open position configured such that a coolant to flow from the valve inlet to the first valve outlet, a second open position configured such that the coolant to flow from the valve inlet to the second valve outlet, and a third position configured such that coolant flows from the valve inlet to the first valve outlet and to the second valve outlet.

16. The thermal functional block of claim 13, wherein the pump is a variable speed pump configured to pump varied flows of a coolant.

17. The thermal functional block of claim 13, wherein the second heat exchanger is disposed in ductwork of a heating, ventilation, and air conditioning system of the vehicle.

18. A thermal functional block for a vehicle, comprising:
a functional block inlet configured to be coupled to a vehicle system;
a three-way valve including a valve inlet, a first valve outlet, and a second valve outlet, wherein the valve inlet is coupled to the functional block inlet;
a first coupling point coupled to the first valve outlet;
a first heat exchanger positioned downstream of the first coupling point;
a splitter having a splitter inlet, a first splitter outlet, and a second splitter outlet, wherein the splitter inlet is coupled to the first heat exchanger;
a pump coupled to the first outlet of the splitter;
a first check valve positioned downstream of the pump;
a second heat exchanger positioned downstream of the first check valve, wherein the first coupling point is downstream of the second heat exchanger, and wherein a coolant circulating through the thermal functional block flows from the first check valve through a first side of the second heat exchanger, and a third heat transfer fluid flows through a second side of the second heat exchanger such that heat is exchanged between the coolant and the third heat transfer fluid;
a second coupling point positioned downstream of the second outlet of the splitter;
a functional block outlet coupled to said vehicle system and downstream of the second coupling point; and
a bypass coupled to the second outlet of the three-way valve and to the second coupling point.

19. The thermal functional block of claim 18, further comprising:
a second check valve positioned downstream of the second splitter outlet and upstream of the second coupling point.

20. The thermal functional block of claim 18, wherein the third heat transfer fluid is a liquid.

\* \* \* \* \*